9232X
J. G. Hotchkiss,
Rotary Steam Engine.
Patented Nov. 7, 1835.
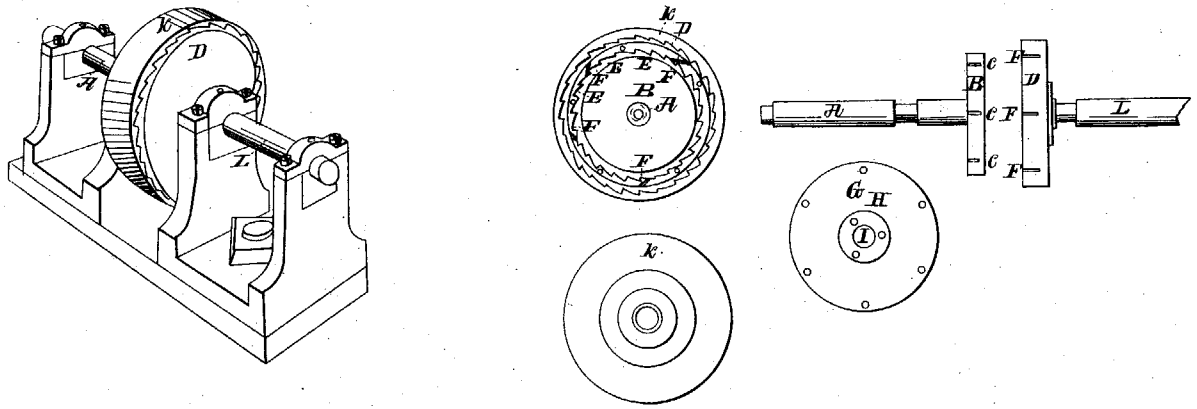
AM. PHOTO-LITHO. CO. N.Y. (OSBORNE'S PROCESS.)

John G. Hotchkiss.
Letters Patent. (Dated November 7. 1835.)

The Schedule referred to in these Letters Patent and making part of the same containing a description in the words of the said John G Hotchkiss himself of his improvement in the direct and reacting Rotary Steam Engine.

---

Be it known that I John G. Hotchkiss of the Town and County of New Haven & State of Connecticut have made an improvement in the useful arts being a direct and Reacting Rotary Steam Engine which is described as follows, reference being had to the annexed drawings of the same, making part of this specification.

It consists of a metallic shaft A. and wheel B. both hollow and united together, the wheel having apertures C. in its periphery for the escape of the steam; which wheel turns within another wheel D. without touching it. On the inside of this last mentioned wheel are projections or buckets E. against which the steam acts, and in the periphery are slits or openings F for its escape being prevented from escaping in any other direction by a circular plate G. screwed on its face; with a packing box H around the opening I. in the plate through which the shaft of the first wheel passes, thus encasing the first wheel.

This second wheel turns within a third wheel K. having similar projections or buckets on the inside for the steam to act against, but the plate is omitted, the steam escaping in front or through openings in the periphery. When however another wheel is required, apertures must be made in the periphery of the third wheel with a plate & packing box as before described, in this manner any required number of hollow wheels may be used; the last wheel being with or without the plate in front but having apertures in the periphery. The shafts A and L. turn in proper bearings on a suitable frame, in contrary directions. The steam is admitted at one end of the hollow shaft passing through it into the hollow wheel at the other end thereof; rushes through the apertures in its periphery and acts upon the first wheel by reaction, giving it a rotary motion in a direction contrary to that in which the steam escapes, the steam having entered the second wheel acts not only by reaction but by direct action on the buckets thereof turning it, and its shaft in a contrary direction to the first wheel, it then enters the third wheel where it acts in the same manner as in the second wheel giving the third wheel a motion in the same direction as the first and contrary to the second wheel, and so on for any required number of wheels, the steam finally escaping at the side or at the periphery of the last wheel into the open air.

The gearing may be effected by means of pulleys & bands or in any convenient mode the pulleys being fastened on the shafts of the steam wheels, the bands passing around and from them to other pulleys required to be turned to give motion to machinery. X.

The steam may be made to pass from the first hollow steam wheel into the centre of the shaft of the second wheel upon which may be placed another hollow steam wheel similar to the first & incased as before described — from this it may pass to a third wheel similarly constructed, and so on to any number that may be required.

Instead of the first steam wheel being made with circular plates & rim it may be made open with arms.

Also instead of the steam escaping through in the rim or periphery it may be made to have egress at the side of the first wheel and act upon projections on the side of the second wheel.

Moreover the circular plate screwed on the face of the second wheel increasing the first may be omitted altogether, the wheels turning one within the other in contrary directions as before described, the steam after passing out at the openings in the periphery of the first wheel and acting on the projections within the second wheel to escape at the side; This I consider a convenient application of the principle of my invention.

The principle of this improvement for which I claim Letters Patent consists in the combination and arrangement of the steam wheels aforesaid operating together in alternate opposite directions by the direct and reacting force of Expd. steam as aforesaid.

W.K. Witnesses, J. C. F. Saloman. Wm P. Elliot. John G. Hotchkiss.

(900 wds)

(Drawing)